UNITED STATES PATENT OFFICE.

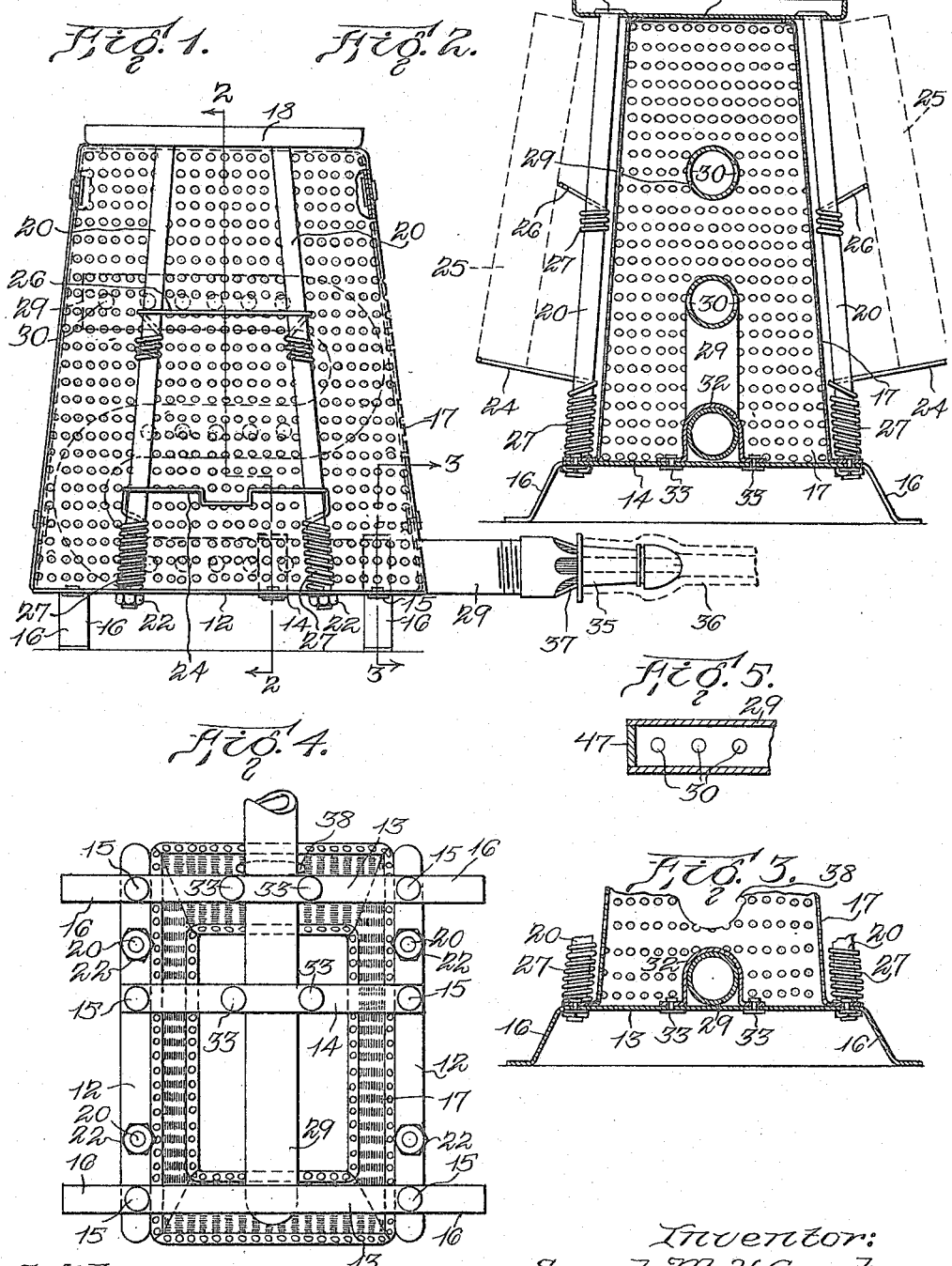

SARAH M. H. GARDNER, OF ANDOVER, MASSACHUSETTS.

TABLE-TOASTER.

1,128,866.  Specification of Letters Patent.  Patented Feb. 16, 1915.

Application filed December 31, 1913. Serial No. 809,763.

*To all whom it may concern:*

Be it known that I, SARAH M. H. GARDNER, a citizen of the United States, and a resident of Andover, in the county of Essex and State of Massachusetts, have invented certain new and useful Improvements in Table-Toasters, of which the following is a specification.

This invention relates to a gas heated implement adapted to be used on a table for toasting bread, preparing coffee and doing other light cooking.

The invention consists in the improvements which I will now proceed to describe and claim.

Of the accompanying drawings:—Figure 1 represents a side elevation of an implement embodying my invention. Fig. 2 represents a section on line 2—2 of Fig. 1. Fig. 3 represents a section on line 3—3 of Fig. 1. Fig. 4 represents a bottom plan view. Fig. 5 represents a sectional view of the upper end portion of the burner tube.

The same reference characters indicate the same parts in all the figures.

The horizontal base of the toaster is preferably of skeleton form composed of longitudinal metal strips 12 and transverse metal strips 13, 13 and 14 secured by rivets 15 to the strips 12. The ends of the strips 13 are bent to form legs 16 adapted to rest on a table and support the base at a suitable distance above the table top.

17 represents a foraminous casing or flue the open lower end of which is seated on the marginal portion of the base, the flue being preferably made of perforated sheet metal, although it may be made of woven wire or otherwise constructed to permit the free passage of heat from its interior to slices of bread supported in close proximity to its exterior.

18 represents a horizontal tray preferably of sheet metal bearing upon and covering the upper end of the flue 17, said tray being preferably provided with an up-turned flange adapted to retain on the tray a vessel in which liquid may be heated. The tray is attached to the base by rods 20 passing through the bottom of the tray and the longitudinal base strips 12, and having heads 21 bearing on the upper side of the tray and nuts 22 bearing on the under sides of the base strips 12, the flue being clamped between the tray and base and by said rods.

The flue is provided with inclined sides from which project edge rests 24 forming bearings for the lower edges of slices of bread 25, and with side rests 26 forming bearings for the inner sides of the slices. Said rests, as here shown, are parts of lengths of wire, the end portions of which have helical coils 27 embracing the rods 20 and held thereon by friction or otherwise. Said rests are arranged to support the slices in inclined position, suitably spaced from the sides of the flue as shown by Fig. 2.

A burner is provided composed of a sinuous tube 29 having a plurality of horizontal stretches, the sides of which have outlets 30 adapted to direct jets of flame outwardly toward the inner sides of the flue. The lower stretch of the tube 29 bears on the base strips 13 and 14, and is attached thereto by clamps 32 secured by rivets 33. One end of the lower stretch of the burner tube is extended through one end of the flue, and provided with a nipple 35 adapted to enter a flexible gas tube 36, and provided with air inlets 37 at its inner end portion. The lower end of the tube 29 therefore constitutes a mixing chamber from which a mixture of gas and air passes to the outlets 30.

The upper end of the tube 29 is closed by a head or plug 47, Fig. 5. The flue is provided with a relatively large opening 38, Figs. 3 and 4, for the insertion of a lighted match to ignite the mixture of gas and air within the flue.

The gaseous mixture burning in the flue supplies sufficient heat to toast bread, and heat water or other liquid in a vessel placed on the tray 18, so that the device may be used to toast bread, and to boil water in preparing coffee, and in cooking eggs and other articles of food.

The skeleton base forms an open frame supported by its legs above a table top, so that air can pass freely upward through the base to support combustion within the foraminous flue. The marginal portion of the base constitutes a seat for the lower end of the flue. The tray 18 and the marginal portion of the base constitute clamping members bearing on opposite ends of the flue, and the rods 20 and their heads and nuts constitute base-and-tray-connecting means whereby said clamping members are confined against the ends of the flue. The base, tray and flue are adapted to be quickly and conveniently assembled, and confined or connected by the said connecting means. The operation of assembling and connecting the described parts provides a very desirable toaster adapted to be used on a breakfast table, and to be used for toasting bread, and for other purposes such as cooking eggs, making coffee, etc.

The foraminous flue, bearing at its ends on both the base and the tray, acts as a tray supporting member contributing materially to the strength and stiffness of the structure, and to the support of a relatively heavy weight on the tray, the flue relieving the base-and-tray-confining rods from a considerable part of the duty of supporting the tray and its load.

I claim:—

1. A table toaster comprising a base formed as an open frame and provided with legs which support it above a table top, so that air can pass freely upward through said base, a vessel-supporting tray elevated above the base, an intermediate flue of foraminous material seated at its lower end on the marginal portion of the base and at its upper end on the under side of the tray and constituting a tray-supporting member, said marginal portion and tray constituting flue clamping members, and base-and-tray-connecting means confining said clamping members against the ends of the flue, the toaster being provided with heating means within said flue above the base, and with means for holding bread in suitable relation to the exterior of the flue.

2. A toaster comprising a skeleton base, a foraminous flue supported by said base, rods extending upwardly from said base in spaced relation to said flue, edge rests comprising wires having their ends coiled around the respective rods, and side rests for preventing the article being cooked from contacting with said rods, also comprising wires coiled around the respective rods and spaced from said edge rests.

In testimony whereof I have affixed my signature, in presence of two witnesses.

SARAH M. H. GARDNER.

Witnesses:
C. F. Brown,
P. W. Pezzetti.

Copies of this patent may be obtained for five cents each, by addressing the "Commissioner of Patents, Washington, D. C."